United States Patent
Lee

(10) Patent No.: US 8,025,412 B2
(45) Date of Patent: Sep. 27, 2011

(54) PUMP UNIT AND PROJECTOR USING SAME

(75) Inventor: Junsi Lee, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 762 days.

(21) Appl. No.: 12/083,286

(22) PCT Filed: Sep. 13, 2007

(86) PCT No.: PCT/JP2007/068316

§ 371 (c)(1),
(2), (4) Date: Apr. 9, 2008

(87) PCT Pub. No.: WO2008/044444

PCT Pub. Date: Apr. 17, 2008

(65) Prior Publication Data

US 2008/0316436 A1 Dec. 25, 2008

(30) Foreign Application Priority Data

Oct. 5, 2006 (JP) ................. 2006-274276

(51) Int. Cl.
*G03B 21/16* (2006.01)
(52) U.S. Cl. .......................................... 353/52
(58) Field of Classification Search ............. 353/57, 353/52; 417/360; 604/146
See application file for complete search history.

(56) References Cited

U.S. PATENT DOCUMENTS

| 3,400,995 A | 9/1968 | Borberg et al. |
| 4,492,530 A | 1/1985 | Schöenwald |
| 7,438,706 B2 * | 10/2008 | Koizumi et al. ............. 604/327 |
| 2006/0024176 A1 * | 2/2006 | Ikeya ............................ 417/366 |

FOREIGN PATENT DOCUMENTS

| JP | 57-200687 A | 12/1982 |
| JP | 62-91827 U | 6/1987 |
| JP | 63-200685 | 12/1988 |
| JP | 5-13402 | 2/1993 |
| JP | 6-1800 | 1/1994 |
| JP | 10-54399 | 2/1998 |
| JP | 10-266998 | 10/1998 |
| JP | 11-68364 | 3/1999 |
| JP | 2000-228754 | 8/2000 |
| JP | 2000-321668 | 11/2000 |
| JP | 2000-321669 | 11/2000 |
| JP | 2001-183746 | 7/2001 |
| JP | 2001-313483 | 11/2001 |
| JP | 2002-310099 | 10/2002 |
| JP | 2003-227491 | 8/2003 |
| JP | 2004-47835 | 2/2004 |
| JP | 2004-54214 | 2/2004 |
| JP | 2005-148624 | 6/2005 |

OTHER PUBLICATIONS

Japanese Office Action dated Nov. 17, 2010, with partial English translation.
Japanese Office Action dated Apr. 6, 2011.

* cited by examiner

*Primary Examiner* — Thanh X Luu
*Assistant Examiner* — Danell L Owens
(74) *Attorney, Agent, or Firm* — McGinn IP Law Group, PLLC

(57) ABSTRACT

A pump unit includes a pump body for discharging compressed air, a communication pipe including an elastic material and having one end fitted into a discharge port, and a pump fixture for fixing part of the communication pipe except for the one end fitted into the discharge port. The pump body is fixed only by the pump fixture.

4 Claims, 7 Drawing Sheets

PUMP UNIT AND PROJECTOR USING SAME

TECHNICAL FIELD

The present invention relates to a cooling apparatus for a projector, and more particularly, to a cooling apparatus which employs a pressure pump represented, for example, by a diaphragm pump.

BACKGROUND ART

A liquid crystal projector includes a cooling apparatus for cooling down heat sources such as a light source, a liquid crystal panel and the like. Fans are widely employed as the cooling apparatus. However, the fan-based cooling simply feeds air to overall heat sources, and encounters difficulties in achieving sufficient cooling effects. For achieving large cooling effects in the fan-based cooling, a motor must be rotated at higher speeds to increase an air velocity. However, this is not a preferred option because a higher rotational speed of the motor results in an increase in vibrations and operation noise of the motor. Also, in a heat source which locally generates heat such as a light source, it is preferable that a heat generating spot is locally cooled down, but the fan encounters difficulties in performing such local cooling.

Accordingly, there has been proposed a cooling apparatus which is capable of performing local cooling, using a pressure pump (see JP2005-148624A). This cooling apparatus includes a pressure pump (compressor) for taking in and compressing air, an air tank for storing the air compressed by the pressure pump, and a cooling nozzle for discharging the air within the air tank. The pressure pump and air tank are coupled through a communication pipe. The cooling nozzle is disposed such that its discharge port is oriented to a desired spot of a heat source. Since the compressed air discharged from the cooling nozzle is fed to the desired spot of the heat source, the heat source is locally cooled down.

DISCLOSURE OF THE INVENTION

However, the cooling apparatus described in JP2005-148625A has the following problems.

Since the pressure pump is designed to have an eccentric rotor, the pressure pump generates vibrations associated with rotating motions of the rotor. Generally, the pressure pump is fixed by securing a pump body to a housing with screws, and vibrations generated by the pressure pump are transmitted from the pressure pump to the housing through a fixture, thereby generating noise.

As countermeasures to the vibrations of the pressure pump, methods contemplated therefor may involve covering the periphery of the pressure pump with a cushion material, or providing an anti-vibration sheet between the pressure pump and housing. However, vibrations of the pressure pump include such vibrations that are transmitted to the housing through the communication pipe attached to the discharge port, and it is difficult for the foregoing methods to suppress noise caused by these vibrations.

It is an exemplary feature of the present invention to provide a pump unit which is capable of solving the foregoing problem, and suppressing noise caused by vibrations of a pressure pump.

To achieve the above and other exemplary features, a pump unit according to an exemplary aspect of the present invention includes a pressure pump for discharging compressed air, a communication pipe including an elastic material and having one end fitted into a discharge port of the pressure pipe, and a fixture for fixing part of the communication pipe except for the one end of the communication pipe fitted into the discharge port, wherein the pressure pump is fixed only by the fixture.

Vibrations of a pressure pump are transmitted to a housing through a portion which fixes the pump. According to the pump unit of the present invention configured as described above, the fixture fixes only part of the communication pipe attached to the discharge port, whereas the pressure pump itself is not actively fixed. Therefore, vibrations of the pressure pump are mainly transmitted to the housing only through the fixture for fixing the communication pipe. Since the communication port is made of an elastic material, most of the vibrations transmitted the pressure pump to the fixture are absorbed by the communication pipe.

According to the present invention, the vibrations of the pressure pump are restrained from being transmitted to the housing, thus making it possible to reduce noise generated by the vibrations of the pressure pump.

The above and other exemplary purposes, features, and advantages of the present invention will become apparent from the following description with reference to the accompanying drawings which illustrate examples of the present invention.

BEST MODE FOR CARRYING OUT THE INVENTION

Figure 1:
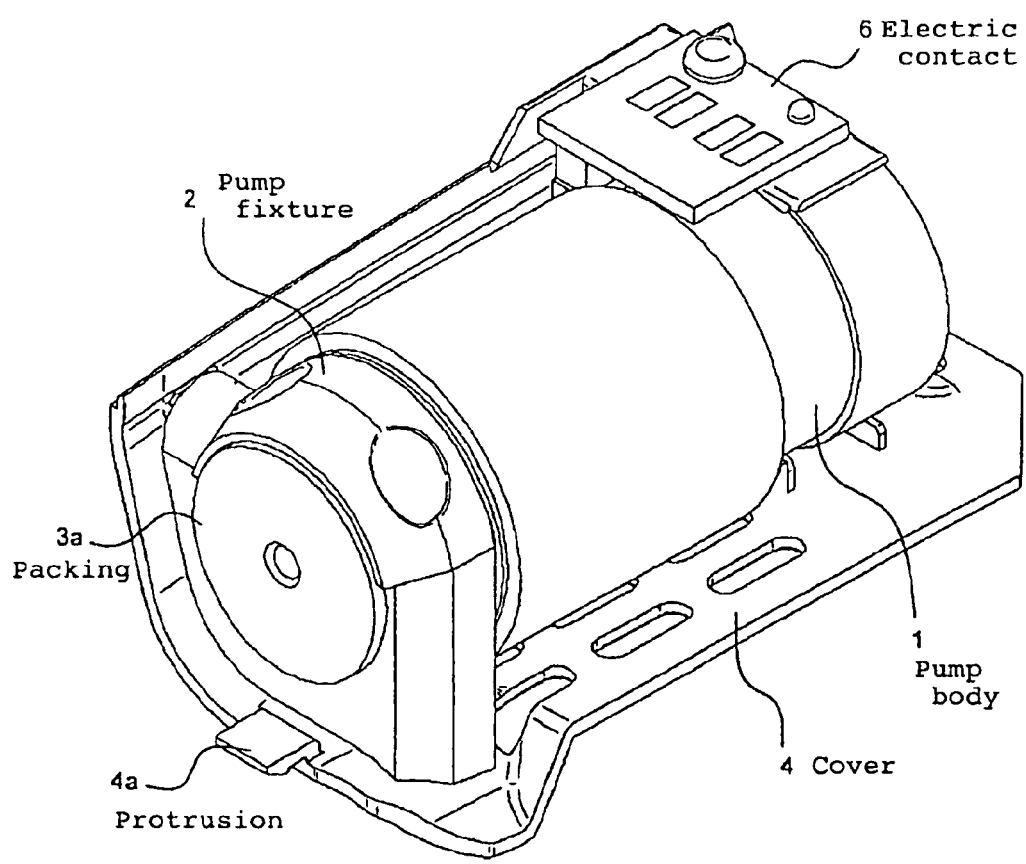
FIG. 1 is a perspective view illustrating the configuration of a pump unit according to an exemplary embodiment of the present invention.
Figure 2:
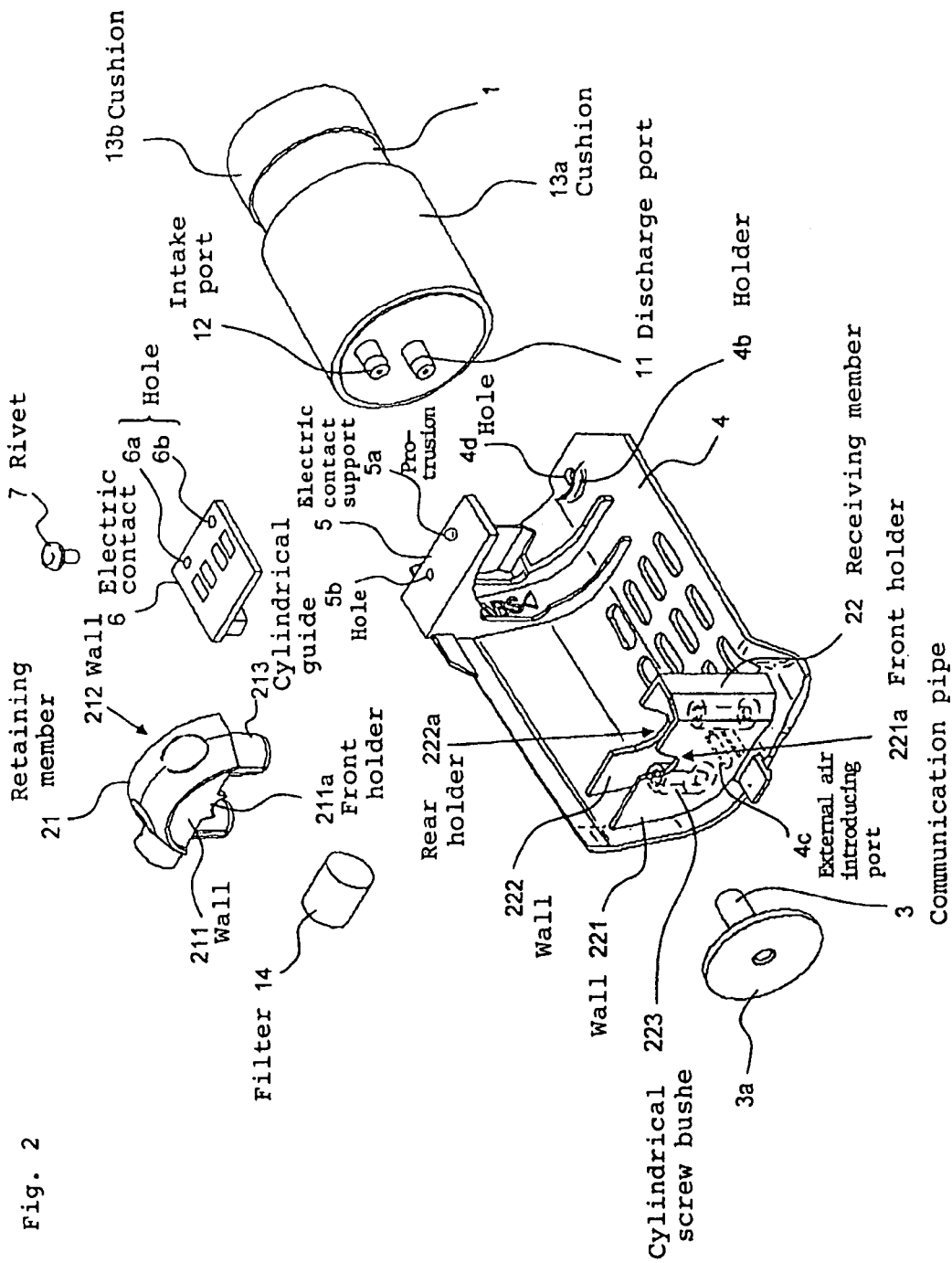
FIG. 2 is an exploded perspective view of the pump unit illustrated in FIG. 1.

FIG. 1 is a perspective view illustrating the configuration of a pump unit according to an exemplary embodiment of the present invention, and FIG. 2 is an exploded perspective view of the pump unit illustrated in FIG. 1.

Referring to FIGS. 1 and 2, the pump unit is a removable (modular) unit mounted in a housing of an electronic device which has a heat source such as a light source, and mainly includes pump body 1, pump fixture 2, communication pipe 3, and cover 4.

Pump body 1 takes in air from intake port 12 for compression, and discharges the compressed air from discharge port 11. A cylindrical filter 14 is attached to intake port 12 for preventing debris from being introduced into the pump. Parts of pump body 1, likely to contact with other members, are covered with a cushion member. The cushion member is made of an elastic material, for example, sponge-like rubber, synthetic resin or the like, which is capable of absorbing vibrations and shocks. In FIG. 2, the periphery of pump body 1 is covered with cushions 13a, 13b.

Communication pipe 3 is preferably made of an elastic material such as rubber, synthetic resin or the like. One end of communication pipe 3 is fitted into discharge port 11. The other end of communication pipe 3 is provided with a discoidal packing 3a. Packing 3a functions to prevent a leak of compressed air fed through communication pipe 3, while the other end of communication pipe 3 is kept pressed against a location of the housing at which a vent is provided to communicate communication pipe 3 with the vent.

Cover 4 includes protrusion 4a for insertion into a hole provided at a predetermined location in a unit chamber of the housing; holder 4b for engagement with a protrusion provided at a predetermined location of the unit chamber; a plurality of external air introducing ports 4c; and hole 4d for screwing cover 4 to the housing. By bringing the protrusion on the housing into engagement with holder 4b with protrusion 4a inserted into the hole in the housing, a precise mounting position can be determined for the pump unit in the housing. With the pump unit thus positioned, hole 4d is positioned right above a screw hole provided at a predetermined location of the housing, so that a screw is inserted into the screw hole of the housing through this hole 4d, thereby fixing cover 4 to the housing.

Cover 4 is provided on its inner wall with pump fixture 2 for fixing pump body 1, and with electric contact support 5. Electric contact support 5 is provided for mounting electric contact 6 thereon, where protrusion 5a and hole 5b for inserting rivet 5 thereinto are provided on a surface on which electric contact 6 is mounted. Electric contact 6 has a plurality of contacts disposed on a board for connecting pump body 1 with a pump driver, not shown. The substrate is provided with hole 6a into which protrusion 5a is fitted, and hole 6b into which rivet 7 is inserted. By inserting rivets 7 into holes 6b, 5b with protrusion 5a of electric contact support 5 fitted into hole 6a of electric contact 6, electric contact 6 is fixed to electric contact support 5.

Pump fixture 2 includes retaining member 21 and receiving member 22. Receiving member 22, which has a "U" shaped cross section, includes front wall 221 (at which the vent of the housing is positioned when the unit is mounted); rear wall 222 (at which pump body 1 is positioned); and cylindrical screw bushes 223 provided between these walls for fixedly screwing retaining member 21. Walls 221, 222 are formed with front holder 221a and rear holder 222a, respectively, at upper ends thereof. Front holder 221a and rear holder 222a are cut into parts of the walls in U-shape.

Retaining member 21 includes a front wall 211, the lower end of which matches with the upper end of wall 221; and rear wall 212, the lower end of which matches with the upper end of wall 222, and is provided with cylindrical guides 213 between these walls 211, 212 for guiding screws when they are screwed into screw bushes 223. Walls 211, 212 are formed with front holder 211a and a rear holder (not shown), respectively, at lower ends thereof. These front holder 211a and rear holder are cut into parts of the walls in U-shape.

With retaining member 21 screwed to receiving member 22, a uniform surface is defined by wall 211 of retaining member 21 and wall 221 of receiving member 22. An opening is formed in part of the surface by front holder 211a of wall 211 and front holder 221a of wall 221. This opening has a diameter smaller than the outer diameter of communication pipe 221, thereby making it possible to fix part of communication pipe 2 with the opening. Similarly, with retaining member 21 screwed to receiving member 22, a uniform surface is defined by wall 212 of retaining member 21 and wall 222 of receiving member 22, and an opening is formed in part of the surface by the rear holder of wall 212 and rear holder 222a of wall 222. A space formed by this opening is sufficiently large so that discharge port 11 and intake port 12 of pump body 1 can be inserted thereinto. Discharge port 11 and intake port 12 of pump body 1 do not come into contact with the rear holder of wall 212 and rear holder 222a of wall 222.

Figure 3A:
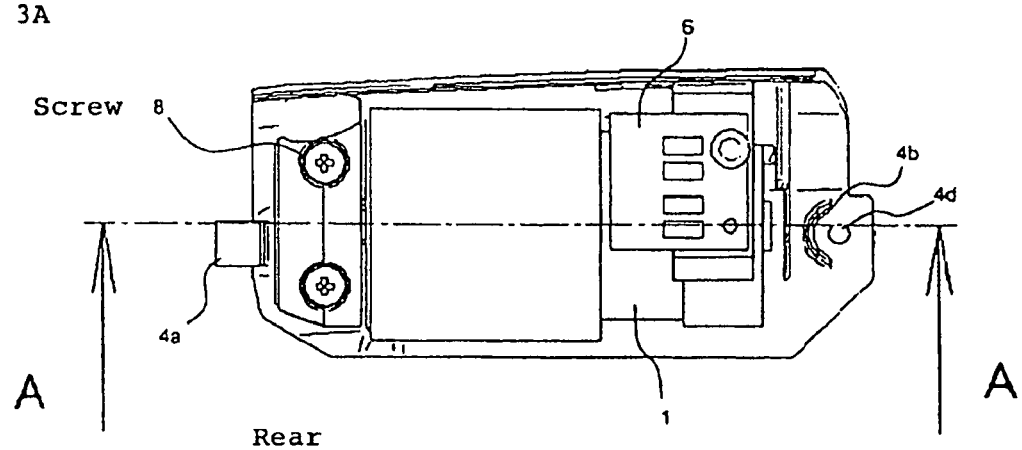
FIG. 3A is a top plan view illustrating how a pump body shown in FIG. 1 is fixed by a pump fixture.
Figure 3B:
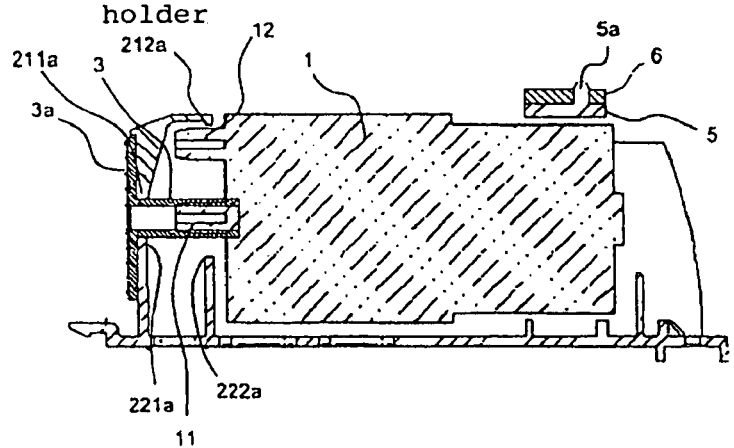
FIG. 3B is a cross-sectional view taken along line A-A in FIG. 3A.

FIGS. 3A and 3B are diagrams for describing how pump body 1 is fixed by pump fixture 2. FIG. 3A is a top plan view, and FIG. 3B is a cross-sectional view taken along line A-A in FIG. 3A.

As illustrated in FIG. 3A, retaining member 21 is screwed to receiving member 22 with screw 8. As illustrated in FIG. 3B, one end of communication pipe 3 is fitted into discharge port 11 of pump body 1, and part of this communication pipe 3 (here, a portion provided with packing 3a), except for the one end fitted into discharge port 11, is fixed by front holder 221a of wall 211 and front holder 221a of wall 221. Packing 3a is disposed over the uniform surface defined by walls 211, 221. When the unit is mounted, packing 3a prevents a leak of compressed air fed through communication pipe 3. Discharge port 11 and intake port 12 of pump body 1 are disposed within the opening formed by rear holder 212a of wall 212 and rear holder 222a of wall 222.

Vibrations of pump body 1 are transmitted to the housing through a portion to which pump body 1 is fixed and a portion which is in contact with pump body 1. According to the fixed state illustrated in FIGS. 3A and 3B, part of communication pipe 3 attached to discharge port 11 is fixed by pump fixture 2. Therefore, pump body 1 is not actively fixed. In other words, there is no means for fixing pump body 1 itself to cover 4. Thus, unless pump body 1 is in contact with other members, vibrations of pump body 1 will be transmitted to the housing only through communication pipe 3 attached to discharge port 11. However, since communication pipe 3 is made of an elastic material, most of the vibrations transmitted from pump body 1 to communication pipe 3 are absorbed by communication pipe 3. This prevents vibrations of pump body 1 being transmitted to the housing through pump fixture 2 to generate noise.

It is noted that since the pump is fixed only by communication pipe 3, pump body 1 may come into contact with other members. Specifically, a rear portion of pump body 1 (portion opposite to the portion at which discharge port 11 is provided) may come into contact with electric contact support 5, or intake pipe 12 may come into contact with rear holder 212a of wall 212. Also, the surface of pump body 1, on which discharge port 11 and intake port 12 are provided, may come into contact with a surface defined by wall 212 of retaining member 21 and wall 222 of receiving member 22, or the periphery of pump body 1 may come into contact with the inner wall of cover 4 and members of the housing. In the pump unit of this exemplary embodiment, the cushion member is applied on these contact portions.

Figure 4:
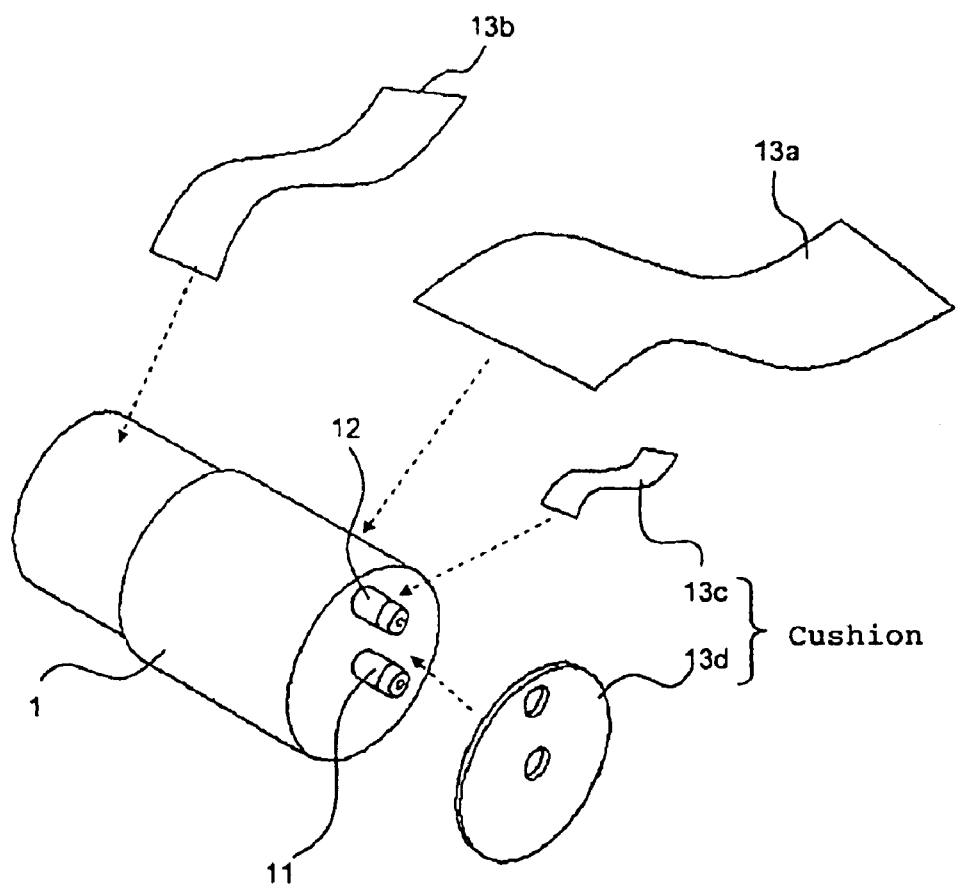
FIG. 4 is a schematic diagram illustrating an exemplary cushion structure provided in the pump body shown in FIG. 1.

FIG. 4 illustrates an exemplary structure of cushions provided on the pump body 1. Referring to FIG. 4, the periphery (including the back) of pump body 1 is covered with cushions 13a, 13b. The periphery of intake port 12 is covered with cushion 13c. The surface of pump body 1, provided with discharge port 11 and intake port 12, is covered with cushion 13d. Cushion 13d has substantially the same size as the surface on which discharge port 11 and intake port 12 are provided, and is provided with holes into which discharge port 11 and intake port 12 are inserted.

According to the cushion structure illustrated in FIG. 4, vibrations of pump body 1 and shocks to pump body 1 are absorbed by cushions 13*a*, 13*b* when the periphery of pump body 1 comes into contact with the inner wall of cover 4 (including electric contact support 5) and members of the housing. Further, vibrations of pump body 1 and shocks to pump body 1 are absorbed by cushions 13*c* when intake port 12 comes into contact with rear holder 212*a* of wall 212. Also, vibrations of pump body 1 and shocks to pump body 1 are absorbed by cushion 13*d* when the surface on which discharge port 11 and intake port 12 are provided comes into contact with the surface defined by wall 212 of retaining member 21 and wall 222 of receiving member 22.

Next, a description will be given of a structure for mounting the pump unit of this exemplary embodiment in a housing of an electronic device.

Figure 5:
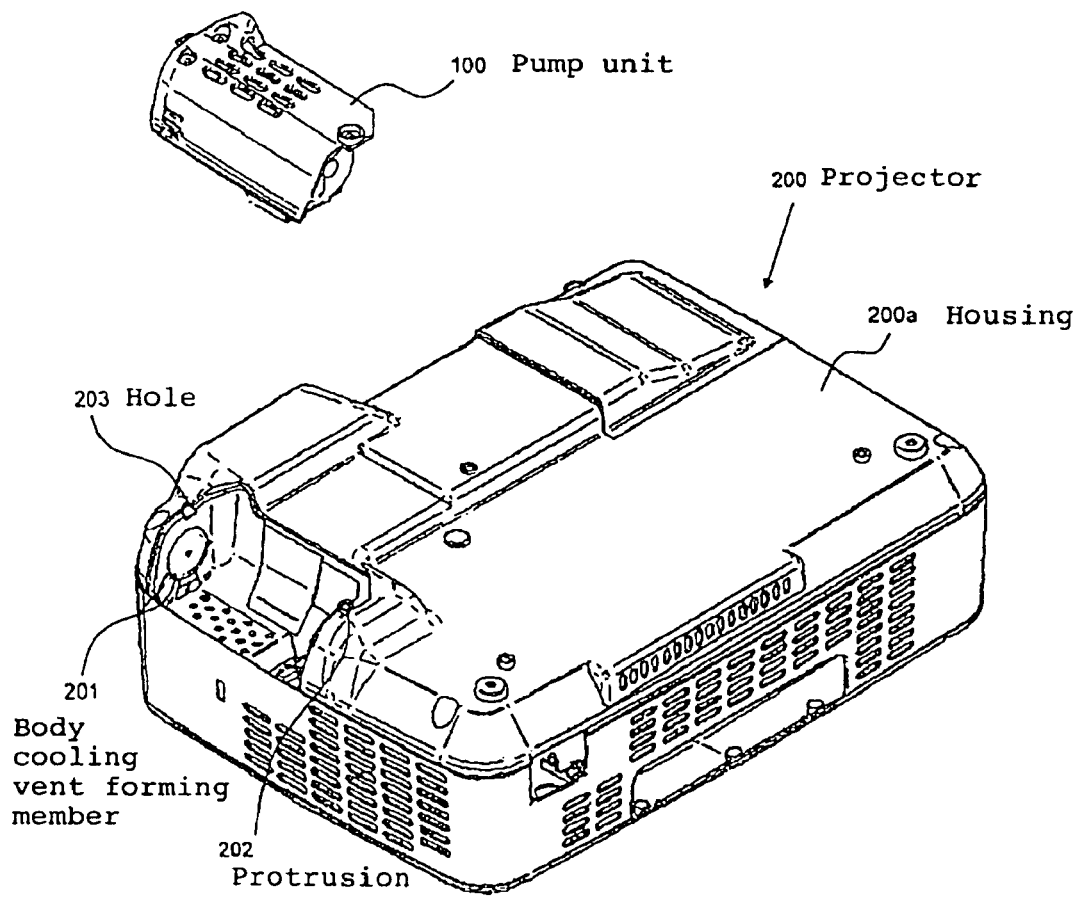
FIG. 5 is a perspective view illustrating the configuration of a projector which is equipped with the pump unit illustrated in FIG. 1.

FIG. 5 is a perspective view illustrating the configuration of a projector which is equipped with the pump unit of this exemplary embodiment. Referring to FIG. 5, projector 200 includes housing 200*a* which contains a light source, a liquid crystal panel, an illumination optical system for irradiating the liquid crystal panel with light from the light source, and the like; and removable pump unit 100 mounted in housing 200*a*. Pump unit 100 is the aforementioned pump unit of this exemplary embodiment.

A portion of housing 200*a* in which pump unit 100 is mounted is formed with body cooling vent forming member 201 against which packing 3*a* of communication pipe 3 is pressed; protrusion 202 for engagement with holder 4*b* of cover 4; and hole 203 for inserting protrusion 4*a* of cover 4 thereinto.

Figure 6:
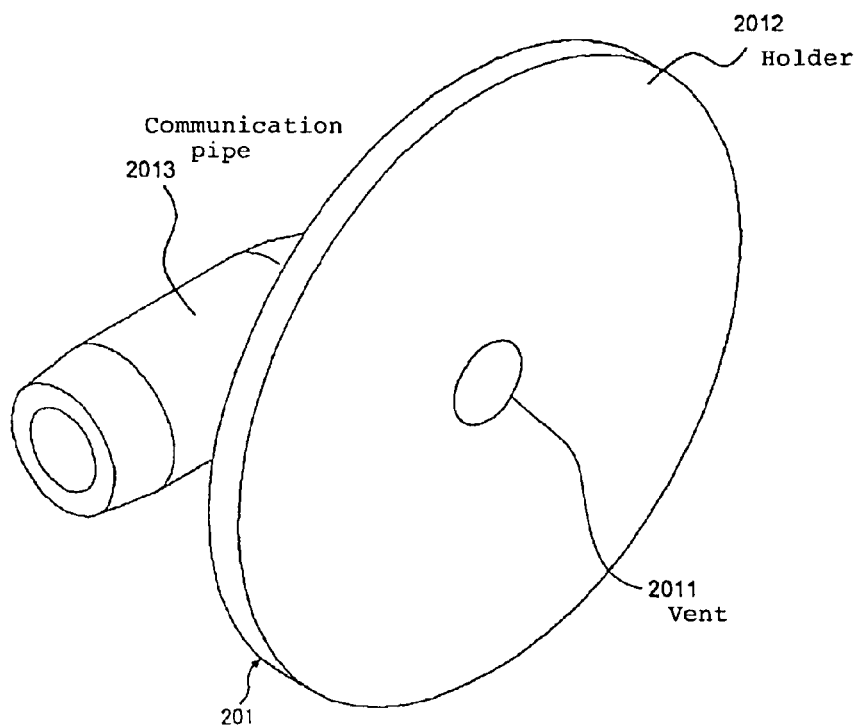
FIG. 6 is a perspective view illustrating the configuration of a body cooling vent forming member shown in FIG. 5.

As illustrated in FIG. 6, body cooling vent forming member 201 includes planar holder 2012 formed with vent 2011 at the center thereof; and communication pipe 2013 for coupling vent 2011 to a pipe within housing 200*a* (communication pipe for leading compressed air discharged from pump body 1 to a heat source). Body cooling vent forming member 201 is attached to a wall into which protrusion 4*a* of cover 4 is inserted.

Figure 7:
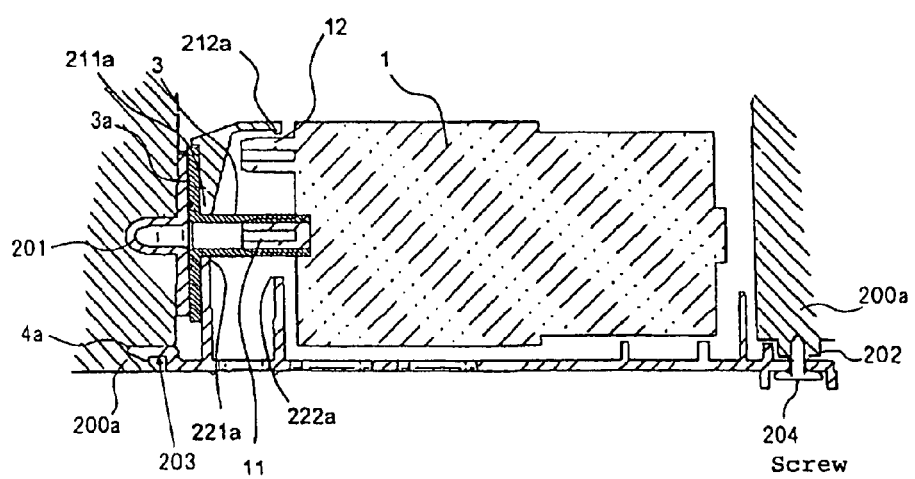
FIG. 7 is a cross-sectional view illustrating how the pump unit illustrated in FIG. 1 is mounted in a housing.

FIG. 7 illustrates the structure in cross-sectional view when pump unit 100 is mounted in housing 200*a*. As illustrated in FIG. 7, protrusion 4*a* of pump unit 100 is inserted into hole 203 of housing 200*a*, and holder 4*b* of pump unit 100 is brought into engagement with protrusion 202 of housing 200*a*, thereby positioning pump unit 100 with respect to housing 200*a*. With pump unit 100 thus positioned, hole 4*a* is positioned right above the screw hole provided in protrusion 202 of housing 200*a*. By inserting screw 204 into the screw hole of housing 200*a* through hole 4*d*, pump unit 100 is fixed to housing 200*a*.

With pump unit 100 fixed to housing 200*a*, packing 3*a* of communication pipe 3 is pressed against holder 2012 of body cooling vent forming member 201 by the surface defined by front walls 211, 221 with an appropriate force. As a result, the discharge port at one end of communication pipe 3 is in communication with vent 2011 of holder 2012, so that air at high static pressure, discharged from discharge port 11 of pump body 1, is fed from vent 2011 to the pipe within housing 200*a*. A heat source such as a light source is disposed beyond the outlet of the pipe, so that a desired part of the heat source can be cooled down by the compressed air from pump body 1.

A force for pressing packing 3*a* against holder 2012 is uniform over the entire surface. For generating the force for pressing packing 3*a* against holder 2012, spacing D between the surface defined by front walls 211, 221 and holder 2012 of body cooling vent forming member 201 is smaller than thickness T of packing 3*a* when pump unit 100 remains fixed to housing 200*a*. The ratio of spacing D to thickness T dominates the force for pressing packing 3*a* against holder 2012. As the value of (T-D) is larger, packing 3*a* is depressed more to increase the effect of preventing an air leak.

Also, guide 213 and screw bush 223 are disposed behind walls 211, 221 (on the side opposite to the side where packing 3*a* is disposed), and increases the rigidity of the surface defined by walls 211, 221. Consequently, packing 3*a* can be pressed against holder 2012 with a sufficient and uniform pressure.

Another Exemplary Embodiment

Figure 8:
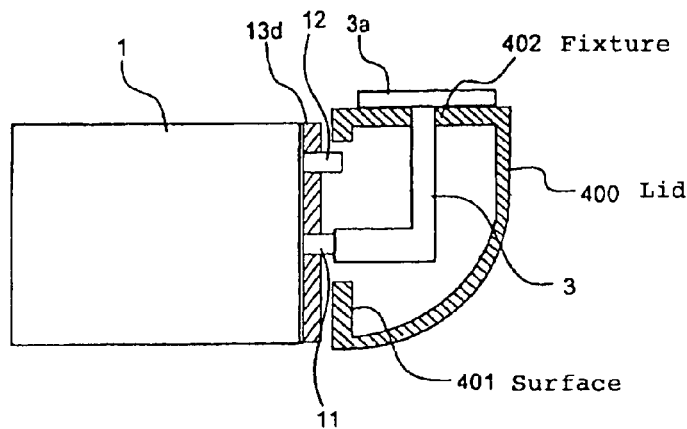
FIG. 8 is a cross-sectional view illustrating the configuration of a pump unit according to another embodiment of the present invention.
Figure 9:
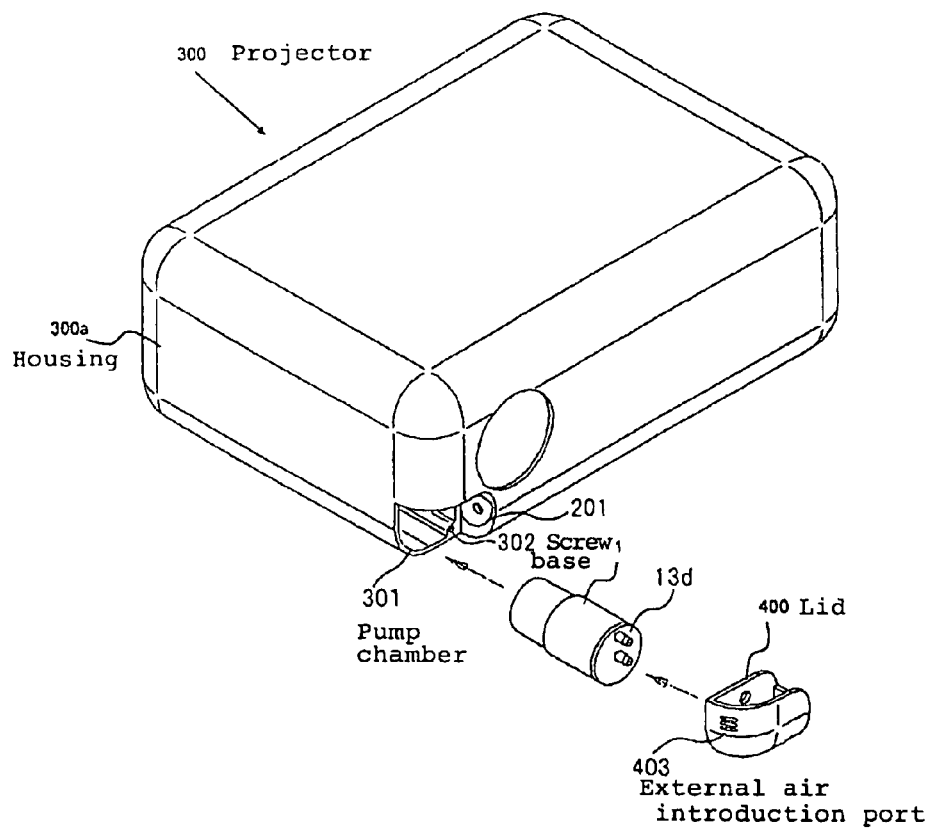
FIG. 9 is a perspective view of a projector which is equipped with the pump unit illustrated in FIG. 8.

FIG. 8 is a cross-sectional view illustrating a pump unit according to another exemplary embodiment of the present invention, and FIG. 9 is a perspective view of a projector which is equipped with the pump unit illustrated in FIG. 8.

Referring to FIGS. 8 and 9, the pump unit is a removable unit mounted in housing 300*a* of projector 300, and mainly includes pump body 1, lid 400 including a pump fixing structure, and communication pipe 3. Pump body 1 and communication pipe 3 are similar to those shown in FIG. 1. One end of communication pipe 3 is fitted into discharge port 11. Cushion 13*d* is applied over a surface of pump body 1 on which discharge port 11 and intake port 12 are provided. A discoidal packing 3*a* is provided at the other end of communication pipe 3.

Housing 300*a* is provided with pump chamber 301 for mounting pump body 1 therein, and body cooling vent forming member 201 is provided near an open end of pump chamber 301. Screw base 302 is provided at the open end of pump chamber 301 for fixing lid 400. Body cooling vent forming member 201 is the same as that shown in FIG. 6.

Lid 400 comprises surface 401 formed with an opening; fixture 402 for fixing part of communication pipe 3 (part of communication pipe 3 except for discharge port 11 and fitted end), and external air introduction port 403. Packing 3*a* is disposed on the outer surface of a wall on which fixture 402 is formed. A space defined by the opening formed through surface 401 is sufficiently large so that discharge port 11 and intake port 12 of pump body 1 can be inserted thereinto. Discharge port 11 and intake port 12 of pump body 1 do not come into contact with the end of the opening.

Though not shown, pump chamber 301 and lid 400 are also provided with positioning means for precisely determining the position at which lid 400 is fixed, such as a protrusion, a holder for receiving the protrusion, and the like. Further, lid 400 is provided with a screw hole for inserting a screw into screw base 302 in the positioned state.

As illustrated in FIG. 9, in the pump unit of this exemplary embodiment, pump body 1 is inserted into pump chamber 301, and lid 400 is screwed to the open end of pump chamber 301. With lid 400 fixed with a screw, packing 3*a* is pressed against holder 2012 of body cooling vent forming member 201 by the outer surface of the wall on which fixture 402 is formed. As a result, communication pipe 3 is in communication with vent 2011 of holder 2012, so that air at high static pressure discharged from discharge port 11 of pump body 1 is fed from vent 2011 to a pipe within housing 300*a*. Packing 3*a* is pressed against holder 2012 with a uniform force over the entire surface. A heat source such as a light source is disposed beyond the outlet of the pipe, so that a desired spot of the heat source can be cooled down by the compressed air from pump body 1.

Likewise, in the pump unit of this exemplary embodiment, part of communication pipe 3 attached to discharge port 11 is fixed by fixture 402. In other words, pump body 1 is not actively fixed, and the pump unit does not include means for fixing pump body 1 itself to the housing or the like. Therefore, unless pump body 1 is in contact with other members, vibrations of pump body 1 are transmitted to the housing only through communication pipe 3 attached to discharge port 11. Since communication pipe 3 is made of an elastic material, most of the vibrations transmitted from pump body 1 to communication pipe 3 are absorbed by communication pipe 3. This prevents vibrations of pump body 1 being transmitted to the housing through pump fixture 2 to generate noise.

It should be noted that since the pump is fixed only by communication pipe 3, pump body 1 can come into contact with other members. It is therefore desirable to apply cushion members over regions of pump body 1 which are likely to contact with other members.

Alternatively, fixture 402 may be in a separate structure like pump fixture 2 shown in FIG. 2. The separate structure includes a retaining member including a first concave holder conforming to the outside shape of communication pipe 3; a receiving member including a second concave holder conforming to the outside shape of communication pipe 3; and fixing means (a screwing mechanism, a fixing mechanism employing a pawl and an engaging part to which the pawl is engaged, or the like) for fixing the retaining member to the receiving member. With the employment of the separate structure, fixture 402 can be reused, thus leading to a lower manufacturing cost.

The pump unit of each exemplary embodiment described above is an example of the present invention, and can be modified in configuration as appropriate without departing from the essence of the present invention that a pressure pump is fixed by fixing part of a communication pipe made of an elastic material and attached to a pump discharge port. For example, in each exemplary embodiment, cushion members are applied over regions of the pump body which are likely to contact other members, but instead, cushions may be applied on members which can come into contact with the pump body.

Also, while the pump unit is in a replaceable or removable unit structure, it may be a fixed unit integrally attached to the housing.

The pump unit of the present invention can be applied to general information processing apparatus represented by a personal computer, and general display devices represented by a liquid crystal device, a plasma display or the like.

This application is based upon and claims the benefit of priority from Japanese Patent Application No. 2006-274276 filed in Japan Patent Office on Oct. 5, 2006, the contents of which are hereby incorporated by reference.

While exemplary embodiments of the present invention have been described using specific terms, such description is for illustrative purposes only, and it is to be understood that changes and variations may be made without departing from the spirit or scope of the following claims.

The invention claimed is:

1. A pump unit comprising:
   a pressure pump that discharges compressed air;
   a communication pipe that comprises an elastic material and that includes one end fitted into a discharge port of said pressure pump; and
   a fixture that fixes part of said communication pipe except for the one end of the communication pipe fitted into said discharge port,
   wherein said pressure pump is fixed only by said fixture,
   wherein said fixture comprises:
   a retaining member that includes a first U-shaped holder which conforms to the outside shape of said communication pipe;
   a receiving member that includes a second U-shaped holder which conforms to an outside shape of said communication pipe; and
   a fixing unit that fixes said retaining member to said receiving member, and
   wherein said communication pipe is fixed by said first and second holders.

2. A projector that includes a light source, and an optical system that projects image light generated by spatially modulating light from said light source, said projector comprising:
   a housing that contains said light source and said optical system; and
   a pump unit mounted in said housing, said pump unit comprising:
   a pressure pump that discharges compressed air;
   a communication pipe that comprises an elastic material and that includes one end fitted into a discharge port of said pressure pipe; and
   a fixture that fixes part of said communication pipe except for the one end of said communication pipe fitted into said discharge port,
   wherein said pressure pump is fixed only by said fixture, and
   at least said light source is cooled down by the compressed air introduced into said housing through said communication pipe.

3. The projector according to claim 2, further comprising a buffer member applied on a portion of said pressure pump which is in contact with other members.

4. The projector according to claim 2, wherein the pressure pump is other than actively fixed.

* * * * *